United States Patent
Uhm

(10) Patent No.: US 12,072,037 B2
(45) Date of Patent: Aug. 27, 2024

(54) COMPACT SPRING RETURN ACTUATOR

(71) Applicant: i-Tork Controls Co., Ltd., Bucheon-si (KR)

(72) Inventor: Se Yong Uhm, Seoul (KR)

(73) Assignee: I-TORK CONTROLS CO., LTD., Bucheon-si (KR)

( * ) Notice: Subject to any disclaimer, the term of this patent is extended or adjusted under 35 U.S.C. 154(b) by 181 days.

(21) Appl. No.: 17/874,538

(22) Filed: Jul. 27, 2022

(65) Prior Publication Data

US 2022/0381363 A1 Dec. 1, 2022

Related U.S. Application Data

(63) Continuation-in-part of application No. PCT/KR2022/007404, filed on May 25, 2022.

(30) Foreign Application Priority Data

May 26, 2021 (KR) .................. 10-2021-0067352
Sep. 15, 2021 (KR) .................. 10-2021-0123318
(Continued)

(51) Int. Cl.
*F16K 31/04* (2006.01)

(52) U.S. Cl.
CPC .......... *F16K 31/047* (2013.01); *F16K 31/043* (2013.01); *F16K 31/046* (2013.01)

(58) Field of Classification Search
CPC .... F16K 31/043; F16K 31/563; F16K 31/535; F16K 31/055; F16K 31/046; F16K 31/047
See application file for complete search history.

(56) References Cited

U.S. PATENT DOCUMENTS

| | | | | |
|---|---|---|---|---|
| 4,533,114 A | * | 8/1985 | Cory | F16K 31/055 |
| | | | | 251/74 |
| 4,570,903 A | * | 2/1986 | Crass | G01L 5/0061 |
| | | | | 73/168 |

(Continued)

FOREIGN PATENT DOCUMENTS

DE 102011018718 A1 * 10/2012 ........... F16K 31/047
JP S62124377 8/1987
(Continued)

OTHER PUBLICATIONS

DE 102011018718 English Translation (Year: 2012).*

*Primary Examiner* — Umashankar Venkatesan
(74) *Attorney, Agent, or Firm* — CANTOR COLBURN LLP

(57) ABSTRACT

Provided is a compact spring return actuator. The actuator includes a driving shaft configured to be rotated by receiving a driving force from a motor, a driven shaft configured to open and close a valve by being rotated by the driving shaft, a deceleration means configured to decelerate a rotational force that is transmitted to the driven shaft, the deceleration means including a differential planetary gear decelerator provided at the driving shaft, and includes an emergency return means provided with an elastic body and an actuation shaft which is configured to convert an elastic force of the elastic body to a rotational force and to transmit the rotational force and which is engaged with the differential planetary gear decelerator, thereby being configured to rotationally return the valve when power is blocked.

5 Claims, 12 Drawing Sheets

(30) Foreign Application Priority Data

Sep. 15, 2021 (KR) ........................ 10-2021-0123319
Sep. 15, 2021 (KR) ........................ 10-2021-0123320
Sep. 15, 2021 (KR) ........................ 10-2021-0123321

(56) References Cited

U.S. PATENT DOCUMENTS

| | | | | |
|---|---|---|---|---|
| 4,621,789 A | * | 11/1986 | Fukamachi | ........... F16K 31/045 185/43 |
| 4,669,578 A | * | 6/1987 | Fukamachi | ........... F16K 31/043 251/71 |
| 4,741,508 A | * | 5/1988 | Fukamachi | ............. F16K 31/53 251/71 |
| 4,754,949 A | * | 7/1988 | Fukamachi | ........... F16K 31/535 475/2 |
| 5,029,597 A | * | 7/1991 | Leon | ..................... F16K 31/046 137/1 |
| 7,321,208 B2 | * | 1/2008 | Ogura | .................. E05F 1/1008 318/1 |
| 8,322,244 B2 | * | 12/2012 | Bucher | ............... F16H 25/2454 74/424.71 |
| 8,382,621 B2 | * | 2/2013 | Chen | ........................ G05G 1/08 475/4 |
| 2019/0024592 A1 | * | 1/2019 | Strååt | ...................... H02P 6/182 |
| 2022/0107026 A1 | * | 4/2022 | Quade | ..................... F16K 15/18 |

FOREIGN PATENT DOCUMENTS

| | | |
|---|---|---|
| JP | H05306784 | 11/1993 |
| JP | 2002281684 | 9/2002 |
| JP | 2012198203 | 10/2012 |
| JP | 2012219895 | 11/2012 |
| JP | 2016023684 | 2/2016 |
| JP | 2019196815 | 11/2019 |
| KR | 20070044423 | 4/2007 |
| KR | 100734394 | 7/2007 |
| KR | 101130983 | 3/2012 |
| KR | 20150039156 | 4/2015 |
| KR | 20200110974 | 9/2020 |
| KR | 20210046870 | 4/2021 |
| KR | 102379149 | 3/2022 |
| KR | 102379150 | 3/2022 |
| KR | 102379151 | 3/2022 |
| KR | 102379152 | 3/2022 |

* cited by examiner

COMPACT SPRING RETURN ACTUATOR

TECHNICAL FIELD

The present disclosure relates to a compact spring return actuator, the actuator being capable of emergency returning a valve when an emergency situation such as a power failure occurs. More particularly, the present disclosure relates to a compact spring return actuator provided with differential planetary gear decelerators respectively provided at a driving shaft actuated by a motor and at an actuation shaft actuated by an elastic body of an emergency return means, the compact spring return actuator being configured such that the differential planetary gear decelerators are engaged with each other so that driving force transmissions of each of the motor and the elastic body are dualized so that the motor and the elastic body do not affect each other, and the compact spring return actuator being configured such that the capacity of the motor is reduced and each component of a driving force transmission system is miniaturized, thereby being capable of reducing the weight of the entire actuator and miniaturizing the entire actuator.

BACKGROUND ART

Industrial structures, which are gradually advanced, have been reorganized. Accordingly, throughout the entire industry field, the industrial structures are integrated and are advanced to an unmanned integrated operating system from a conventional manned individual operating system. Therefore, an efficient integrated operating system has been established. Particularly, in a part related to a valve that controls the flow of fluid, use of an automatic valve capable of being efficiently and remotely controlled and various automatic flow rate control apparatuses has rapidly spread.

An electric actuator used in such an automatic flow rate control apparatus is a driving apparatus essential for automating a valve, a damper for an adjustment, or the like, and the electric actuator is comprised of a control unit, an annexed gear apparatus, a motor, and so on.

In briefly describing a typical structure of the electric actuator, the electric actuator includes a motor configured to rotate according to an application of power, a driving shaft configured to rotate according to the motor, and a driven shaft configured to open and close a valve by being rotated by receiving a decelerated rotational force from the driving shaft. Therefore, the valve is opened and closed as the driven shaft rotates in both directions by the actuation of the motor.

However, in such a conventional electric actuator, when power that drives the motor is blocked due to an occurrence of an emergency situation such as a power failure while the valve is in an opened state, a driving means including the motor is stopped at the same time, so that opening and closing actuations of the valve are not capable of being performed.

In such a situation, when a stopped state of the valve is maintained for a long time, there is a risk of a safety accident such as a fluid leakage, equipment destruction, and so on, due to failure of various components of the actuator, breakage of a pipeline through which a fluid flows, or the valve that is stopped during the actuation (or after the actuation is finished).

Accordingly, as can be seen in Korean Patent No. 10-1130983 and so on, a spring return valve actuator which uses an elastic force of a spring when an emergency situation such as a power failure and a state in which a motor is not capable of being controlled occurs and which is capable of returning a valve to a state before the valve is initially actuated has been used.

However, the conventional electric actuator has problems as follows.

First, the conventional electric actuator is configured such that a coil spring or a torsion spring is connected to a driven shaft that rotates a valve so that the valve is opened and closed. That is, the coil spring or the torsion spring is connected to an output side of the electric actuator, and a driving force transmission system in which turning on power, operating a motor, gear operating a deceleration unit, compressing a spring, and actuating the valve are performed is formed. Therefore, since an accumulation and a relief of an elastic force of the spring occur according to a motor actuation, the motor is also required to have high output, so that there is a problem that the actuator is required to have a large size.

Second, in a designed structure of the conventional electric actuator, since a return shock is wholly transmitted to gear components as the elastic force of the spring is directly transmitted to the driven shaft, there is a high risk of the occurrence of failure, so that there is a problem that the gear components become larger since the gear components are manufactured of a high strength material.

Third, since the coil spring or the torsion spring used in the conventional electric actuator have a large difference between an elastic value in a preload and an elastic value in a fully compressed state, a force and a strength of both the motor and the gears that are required to reduce a speed are required to be matched to the force and the strength in the fully compressed state of the spring. Therefore, since the conventional electric actuator has the large size and the heavy weight, use of the conventional electric actuator by the user is difficult, and there is a problem that the conventional electric actuator having the large volume is manufactured since the motor has the large size due to the high output of the motor and the gears have the large size to secure rigidity thereof.

Fourth, since the conventional electric actuator is configured such that an electromagnetic brake that limits the actuation of the compressed spring is always turned on and magnetization occurs, there is a problem that the electromagnetic brake is not accurately actuated in an emergency situation.

Fifth, in the conventional electric actuator, there is a problem that a stopper that stops the valve after an emergency returning actuation is easily broken by a strong shock.

DISCLOSURE

Technical Problem

Accordingly, the present disclosure has been made keeping in mind the above problems occurring in the related art, and an objective of the present disclosure is to provide a compact spring return actuator.

Further, in an actuator capable of automatically returning a valve to an original position when an emergency situation such as a power failure occurs, there is provided the compact spring return actuator provided with differential planetary gear decelerators respectively provided at a driving shaft actuated by a motor and at an actuation shaft actuated by an elastic body of an emergency return means, the compact spring return actuator being configured such that the differential planetary gear decelerators are engaged with each other so that driving force transmissions of each of the motor and the elastic body are dualized so that the motor and the elastic body do not affect each other, and the compact spring return actuator being configured such that the capacity of the motor is reduced and each component of a driving force transmission system is miniaturized, thereby being capable of reducing a weight of the entire actuator and miniaturizing the entire actuator.

Technical Solution

In order to achieve the above objective, according to the present disclosure, there is provided a compact spring return actuator, the actuator including:

a driving shaft configured to be rotated by receiving a driving force from a motor;

a driven shaft configured to open and close a valve by being rotated by the driving shaft;

a deceleration means configured to decelerate a rotational force that is transmitted to the driven shaft, the deceleration means including a differential planetary gear decelerator provided at the driving shaft; and an emergency return means provided with an elastic body and an actuation shaft which is configured to convert an elastic force of the elastic body to a rotational force and to transmit the rotational force and which is engaged with the differential planetary gear decelerator, thereby being configured to rotationally return the valve when power is blocked.

In addition, the compact spring return actuator according to the present disclosure may include:

a braking means, the braking means being provided with at least two electromagnetic brakes that limit an actuation of the emergency return means, and the braking means being configured to be set such that on and off actuations of each of the electromagnetic brakes are alternately operated every predetermined time so that other of the electromagnetic brakes are turned off when one of the electromagnetic brakes is turned on.

In addition, in the compact spring return actuator according to the present disclosure, the elastic body may be formed of an S-shaped spiral spring.

In addition, in the compact spring return actuator according to the present disclosure, the deceleration means may include:

a first differential planetary gear decelerator provided at the driving shaft; and a second differential planetary gear decelerator which is provided at the actuation shaft and which is engaged and connected with the first differential planetary gear decelerator.

Advantageous Effects

The compact spring return actuator according to the present disclosure has effects as follows.

According to the compact spring return actuator of the present disclosure, in the actuator capable of automatically returning the valve to the original position when an emergency situation such as a power failure occurs, since the driving force transmission systems of the motor and the elastic body are not interfering with each other and are dualized, the amount of load that the motor handles is reduced, so that a torque required to open and close the valve is secured with only a small motor having a low output and the compact spring return actuator can be safely used. Further, by reducing a return shock applied to the connected gear components through the S-shaped spiral spring, the force and the strength of the gear components do not have to be large, so that the gear components can be miniaturized, thereby being capable of miniaturizing the actuator and reducing the weight of the actuator by significantly reducing the size of the actuator comparing to a conventional actuator having the same torque.

Further, even if the motor having small capacity is used, the final torque that is output is capable of being designed to match a reference torque by utilizing a deceleration ratio after the emergency return means is actuated since the emergency return means is not directly connected to the driven shaft and is connected to the driving shaft that is a middle portion of the deceleration means.

Further, since the magnetization of the electromagnetic brakes are prevented, there is an effect of preventing a problem that the electromagnetic brakes are not properly actuated in an emergency situation.

Further, by using a hydraulic stopper, there is an effect that the shock to the valve (a worm wheel portion) that is rotated in a high speed by the emergency return means can be relieved and the valve can be safely stopped.

DESCRIPTION OF DRAWINGS

FIG. 4 is a cross-sectional view illustrating the main parts in FIG. 2a.

DESCRIPTION OF MAIN PARTS OF DRAWINGS

Figure 1A:
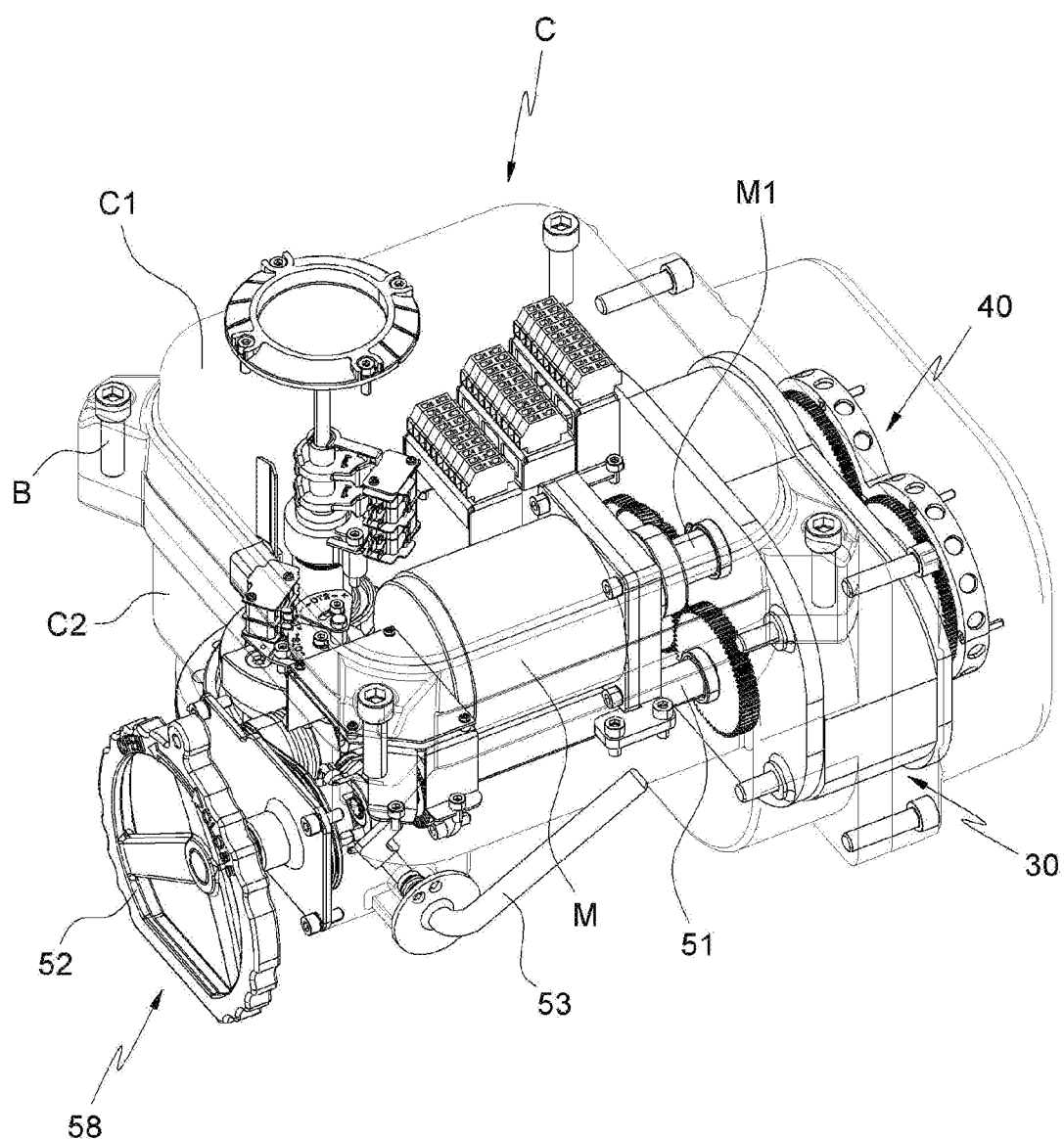
FIGS. 1a and 1b are external perspective views illustrating a compact spring return actuator according to the present disclosure.

M: motor 10: driving shaft
20: driven shaft 30: emergency return means
40: braking means 50: manual opening and closing means
60: hydraulic stopper

BEST MODE

The present disclosure may be modified in various ways and implemented by various exemplary embodiments, so aspects (or embodiments) will be described in detail. However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure.

In the drawings, like reference numerals, particularly, reference numerals having the same last two digits or the same last two digits and letters, refer to like elements having like functions throughout. Unless the context clearly indicates otherwise, elements referred to by reference numerals of the drawings should be understood on the basis of this standard.

In addition, the elements in the accompanying drawings are exaggerated in size or thickness to be large (or thick) or small (or thin), or simplified for convenience of understanding, but such exaggeration or simplification is not construed as limiting the scope of the present disclosure.

The terms used in the present specification are only to describe specific aspects (or embodiments), but not intended to restrict the present disclosure. As used herein, the singular forms are intended to include the plural forms as well, unless the context clearly indicates otherwise.

In the present application, it will be understood that terms 'comprise', 'include', etc. are to designate the presence or addition of one or more other features, numbers, steps, operations, elements, components, or combination thereof described in this specification, but do not preclude the presence or addition of one or more other features, numbers, steps, operations, elements, components, or combination thereof.

Unless defined otherwise, all terms used herein including technical or scientific terms have the same meanings as generally understood by a person having ordinary knowledge in the art to which the present disclosure pertains. The terms defined in general dictionaries are construed as having meanings consistent with the contextual meanings of the art, but not interpreted as ideal meanings or excessively formal meanings unless explicitly defined in the present application.

Terms such as 'a first' and 'a second' are used only for the purpose of distinguishing a constitutive element from another constitutive element, but a constitutive element should not be limited to a manufacturing order, and the terms described in the detailed description of the present disclosure may not be consistent with those described in the claims.

Figure 1B:
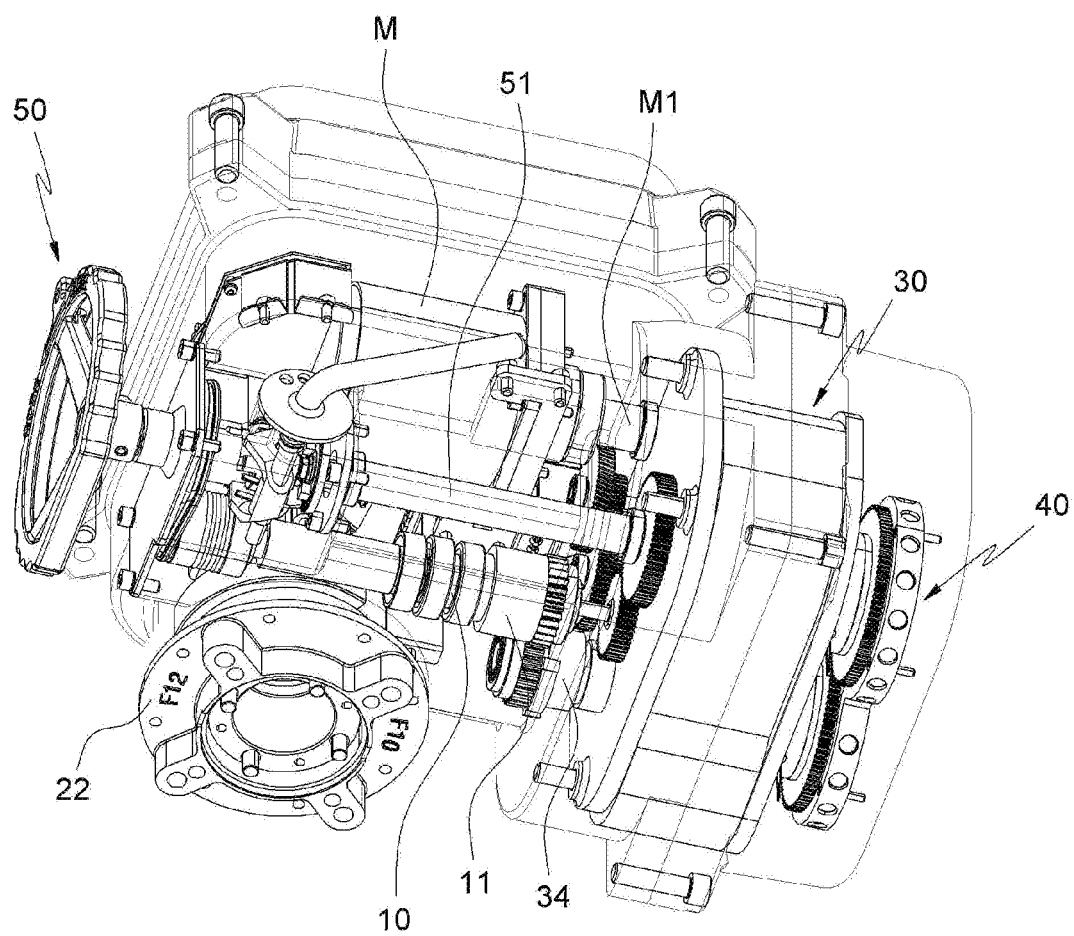
Figure 2A:
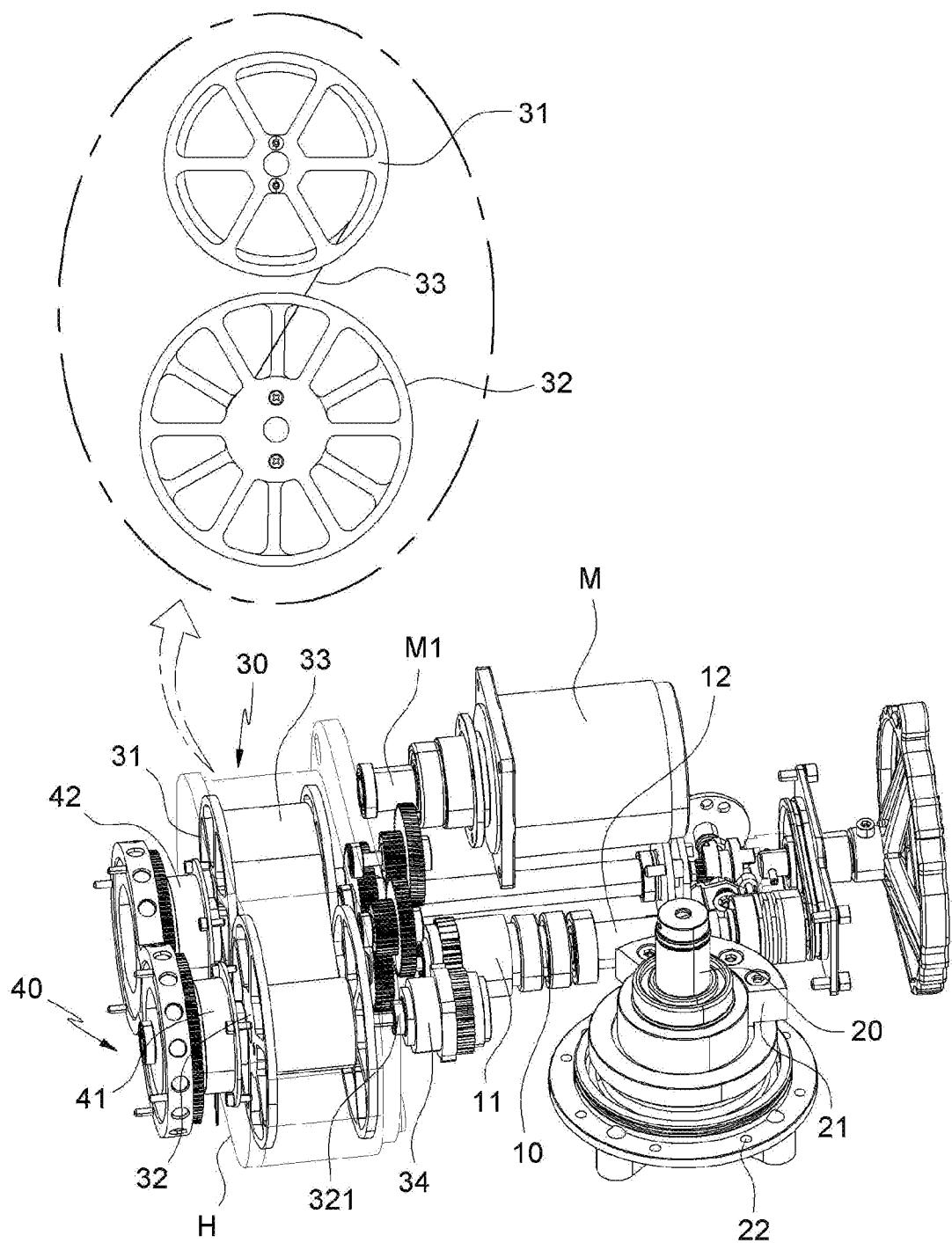
FIGS. 2a and 2b are perspective views illustrating main parts of the compact spring return actuator according to the present disclosure.
Figure 2B:
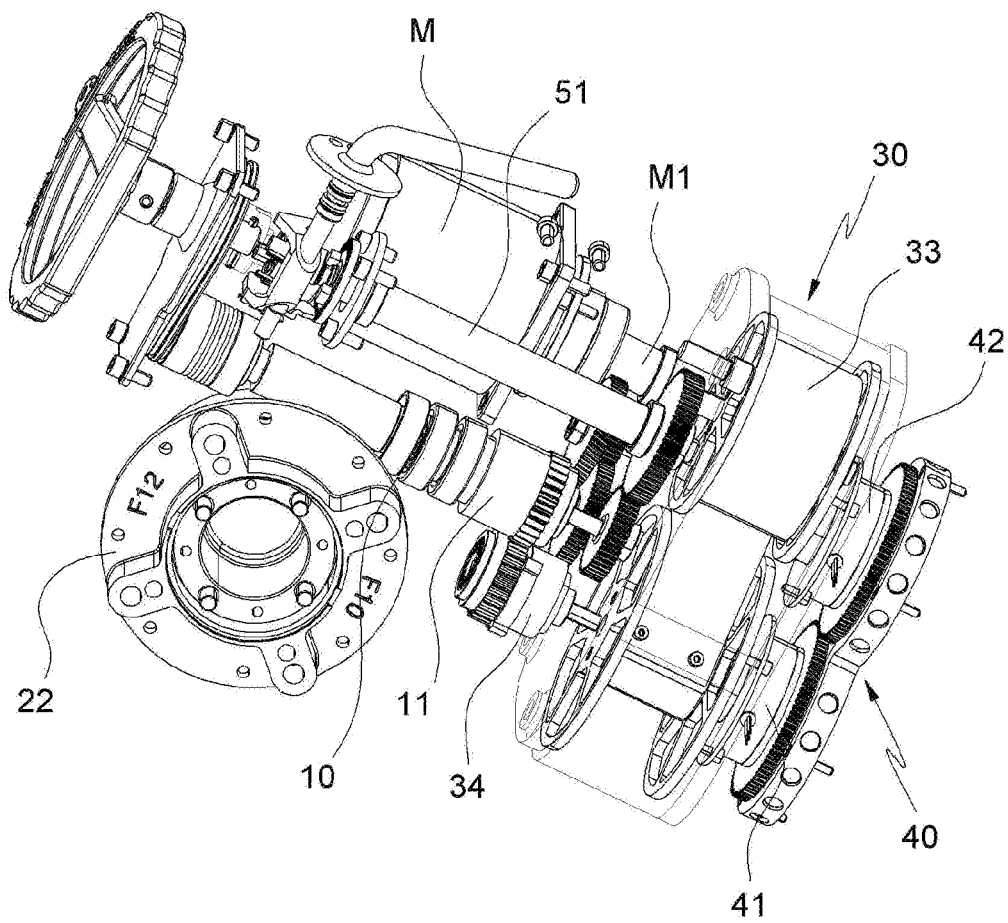
Figure 3A:
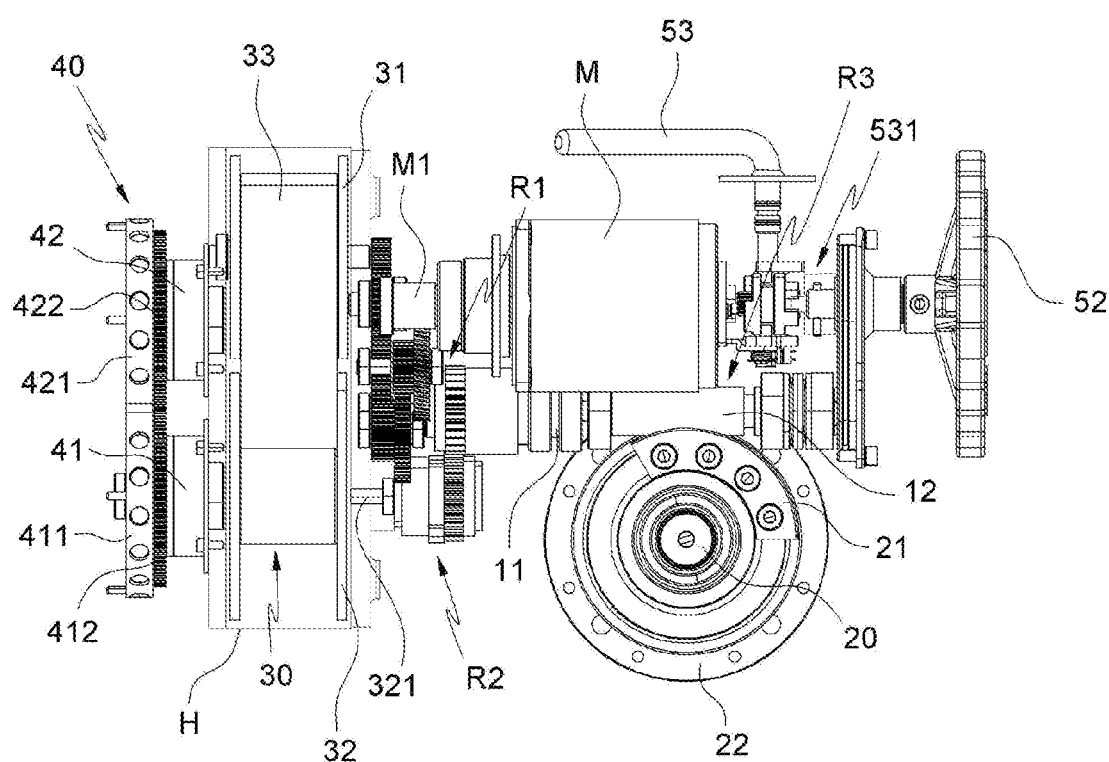
FIGS. 3a to 3c are a plan view, a front view, and a bottom view of FIG. 2a, respectively.
Figure 3B:
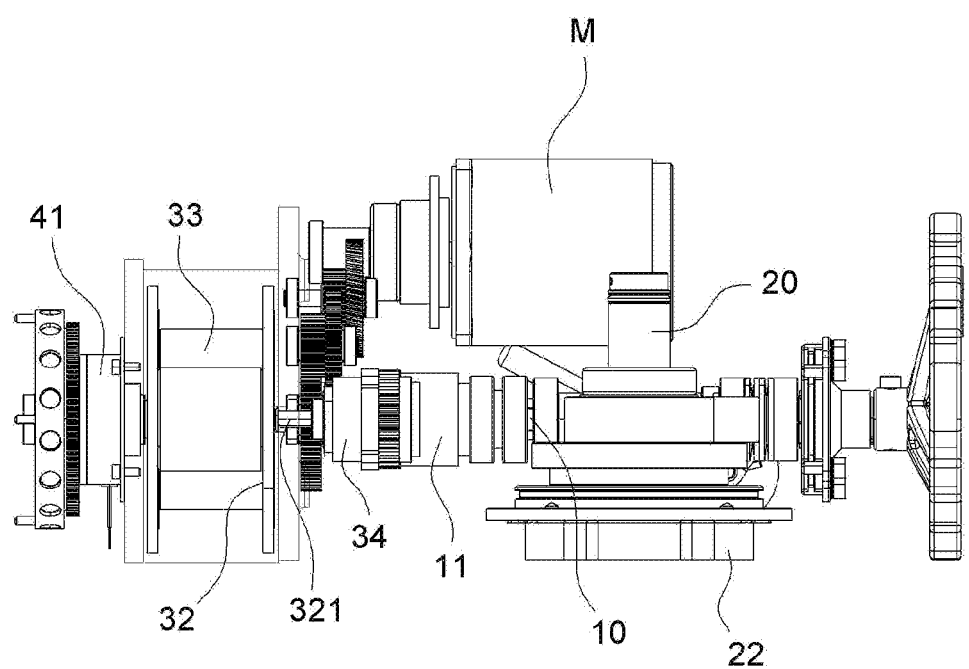
Figure 3C:
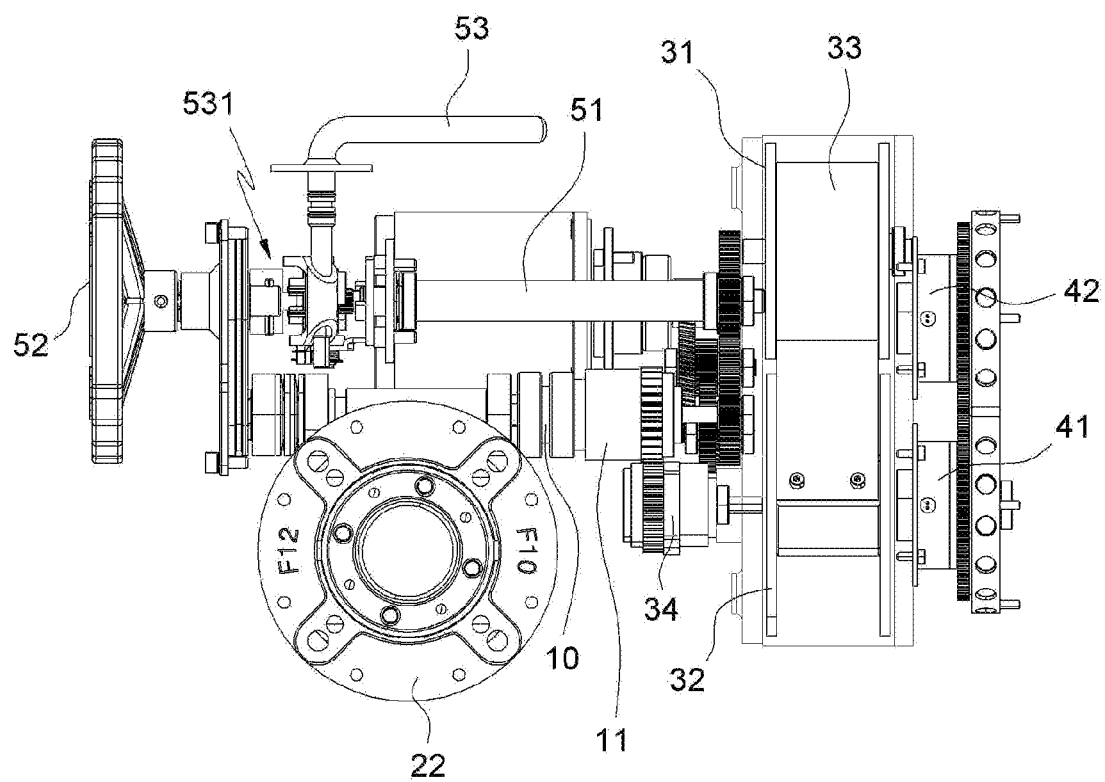
Figure 4:
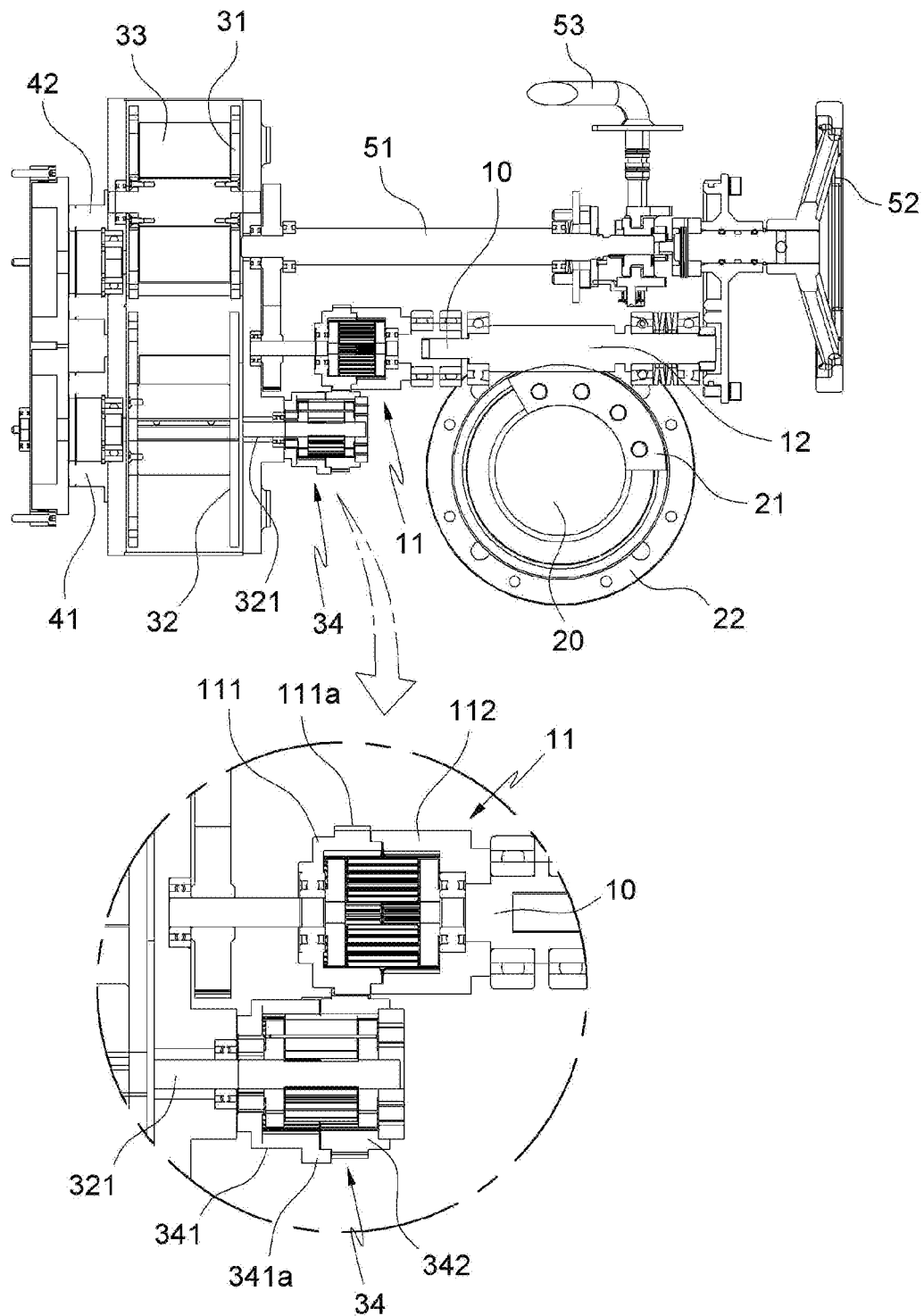
Figure 5A:
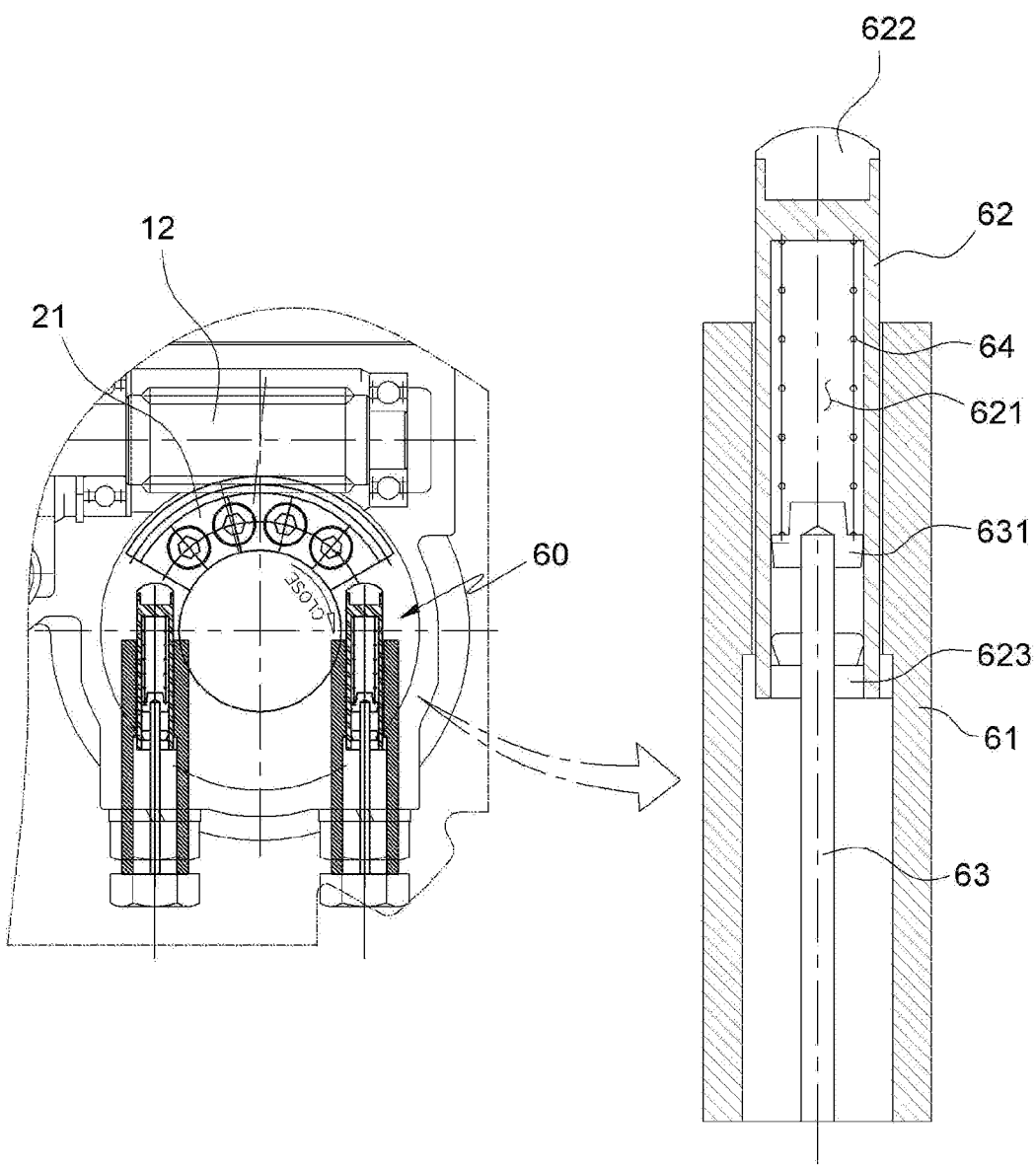
FIGS. 5a and 5b are cross-sectional views illustrating main parts of a hydraulic stopper of the present disclosure.
Figure 5B:
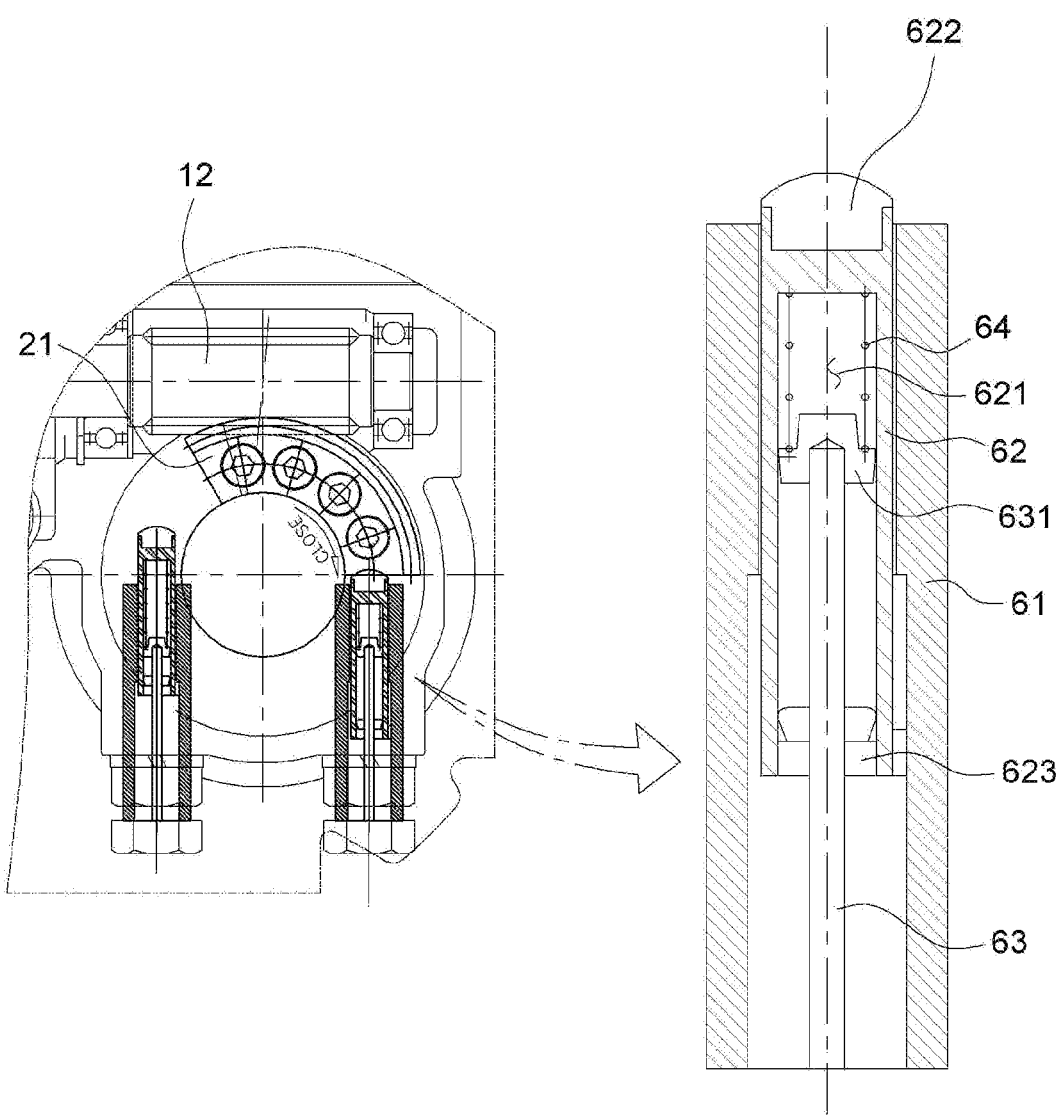

For convenience of the description of a compact spring return actuator according to the present disclosure, when an approximate direction rather than a precise direction is specified with reference to FIGS. 1a and 1b, a lower side is determined on the basis of a direction to which gravity is applied, and an upper side, the lower side, a left side, and a right side are determined on the basis of the lower side. This standard may be also applied to the other drawings, and directions may be specified and described on the basis of this standard unless the detailed description of the present disclosure and the claims specially indicate otherwise.

Hereinafter, the compact spring return actuator according to the present disclosure will be described with reference to the attached drawings.

As illustrated in FIGS. 1a to 5b, the present disclosure relates to a compact spring return actuator capable of automatically returning a valve to an original position when an emergency situation such as a power failure occurs. Further, the compact spring return actuator includes a driving shaft 10 actuated by a motor M, a driven shaft 20 opening and closing a valve (not illustrated), a deceleration means reducing a rotational force of the motor M or a rotational force of an emergency return means 30, the emergency return means 30 rotationally returning the valve to a position before the valve is initially actuated, a braking means 40 of the emergency return means 30, and a manual opening and closing means 50.

Specifically, the present disclosure includes:
the driving shaft 10 configured to be rotated by receiving a driving force from the motor M;
the driven shaft 20 configured to be rotated by the driving shaft 10, thereby opening and closing the valve (not illustrated);
the deceleration means configured to reduce the rotational force that is transmitted to the driven shaft 20; and
the emergency return means 30 provided with an elastic body and an actuation shaft 321 that is configured to convert an elastic force of the elastic body to a rotational force and to transmit the rotational force, thereby being configured to rotationally return the valve when power is blocked.

Further, the deceleration means includes:
a first differential planetary gear decelerator 11 provided at the driving shaft 10; and
a second differential planetary gear decelerator 34 which is provided at the actuation shaft 321 and which is engaged and connected with the first differential planetary gear decelerator 11.

The deceleration means includes gear portions 111a and 342a which are respectively formed on respective outer circumferential surfaces of a stationary ring gear 111 of the first differential planetary gear decelerator 11 and a differential ring gear 342 of the second differential planetary gear decelerator 34 and which are engaged with each other.

The deceleration means includes a spur gear deceleration unit R1 engaged and connected between a rotary shaft M1 of the motor M and the driving shaft 10.

In addition, the present disclosure includes the braking means 40 provided with at least two electromagnetic brakes limiting an actuation of the emergency return means 30, the braking means 40 being configured to be set such that on and off actuations of each of the electromagnetic brakes are alternately operated every predetermined time so that other electromagnetic brake is turned off when one electromagnetic brake is turned on.

The electromagnetic brakes include interlocking gears 412 and 422 that are capable of being rotated together with the actuation shaft 321 while being in an off state.

In the braking means 40, the interlocking gears 412 and 422 of the respective electromagnetic brakes are engaged and connected with each other, and the actuation shaft 321 is connected to one interlocking gear 412 of the electromagnetic brakes.

The deceleration means includes the spur gear deceleration unit R1 engaged and connected between the rotary shaft M1 of the motor M and the driving shaft 10.

The elastic body is formed of an S-shaped spiral spring 33.

The emergency return means 30 includes:
a first rotating body 31 mounted at a first side of a housing H; and
a second rotating body 32 which is mounted at a second side of the housing H and which is provided with the actuation shaft 321 that is configured to transmit a rotational driving force to the valve.

Further, the S-shaped spiral spring 33 has a first side end which is connected to and wound on the first rotating body 31 such that an elastic force is accumulated, and has a second side end connected to the second rotating body 32.

The actuation shaft 321 is engaged with the stationary ring gear 111 of the first differential planetary gear decelerator 11.

First, in the driving shaft 10, an end gear at an input side of the driving shaft 10 is connected to the spur gear deceleration unit R1 of the deceleration means. Further, the driving shaft 10 includes the first differential planetary gear decelerator 11 that is provided at the input side, and includes a worm shaft portion 12 that is provided at an output side of the driving shaft 10.

In addition, together with the second differential planetary gear decelerator 34 provided at the actuation shaft 321 of the emergency return means 30, the first differential planetary gear decelerator 11 forms a differential planetary gear deceleration unit R2. Further, together with a worm wheel portion 21 of the driven shaft 20, the worm shaft portion 12 forms a worm gear deceleration unit R3.

The driven shaft 20 is connected to the driving shaft such that the driven shaft 20 is in a direction orthogonal to the driving shaft 10. Further, the driven shaft 20 includes the worm wheel portion 21 which is positioned at an input side of the driven shaft 20 and which is engaged with the worm shaft portion 12, and includes an opening and closing body 22 which is positioned at an output side of the driven shaft 20 and which is coupled to the valve.

At this time, since most valves are opened and closed by being rotated 90 degrees, the worm wheel portion 21 does not have a circular ring shape formed in a circumferential direction of the driven shaft 20, and the worm wheel portion 21 has an arc shape.

In addition, the deceleration means includes the spur gear deceleration unit R1, the differential planetary gear deceleration unit R2, and the worm gear deceleration unit R3.

The spur gear deceleration unit R1 is formed by sequentially engaging spur gears with each other between the rotary shaft M1 of the motor M and the driving shaft 10, the spur gears having teeth that have diameters different from each other.

Accordingly, the spur gear deceleration unit R1 primarily decelerates the rotational force of the motor M and transfers a decelerated rotational force to the input side of the driving shaft 10.

sun gears (not illustrated) respectively connected to input sides of the first differential planetary gear decelerator 11 and the second differential planetary gear decelerator 34 are respectively disposed at center positions of the first differential planetary gear decelerator 11 and the second differential planetary gear decelerator 34, and planetary gears are disposed in a circumferential direction of each of the sun gears, so that the sun gears and the planetary gears are engaged with each other. Further, the first differential planetary gear decelerator 11 and the second differential planetary gear decelerator 34 are respectively formed of the stationary ring gears 111 and 341 which are respectively positioned at the respective input sides and which are internally engaged with outer sides of the planetary gears and which are arranged back and forth but are not rotated, and are respectively formed of the differential ring gears 112 and 342 which are positioned at respective output sides and which are connected with the output side (that is, the worm shaft portion 12) of the driving shaft 10 and which are capable of being rotated.

In addition, the stationary ring gear 111 of the first differential planetary gear decelerator 11 and the differential ring gear 342 of the second differential planetary gear decelerator 34 are engaged with each other by the gear portions 111a and 342a that are respectively formed on outer circumferential surfaces of each of the stationary gear 111 and the differential ring gear 342.

Such a differential planetary gear deceleration unit R2 decelerates and transmits a rotational force transmitted to the input side to the output side and, on the contrary, does not transmit a rotational force transmitted to the output side to the input side by a self-lock function of each of the differential planetary gear decelerators 11 and 34.

Accordingly, the first differential planetary gear decelerator 11 is configured as follows.

In the first differential planetary gear decelerator 11, the rotational force input to the driving shaft 10 is secondarily decelerated and transmitted to the driven shaft 20.

Meanwhile, since a rotational force which is applied to the valve by a pressure of a fluid and so on and which is transmitted to the driven shaft 20 is not transmitted to the spur gear deceleration unit R1 that is connected to the input side of the driving shaft 10, the first differential planetary gear decelerator 11 prevents an unintentional closing actuation of the valve in an opened state and, at the same time, prevents a transmitted return shock from being transmitted to the spur gear deceleration unit R1 and the motor M.

In addition, in the second differential planetary gear decelerator 34, since the second differential planetary gear decelerator 34 does not receive the rotational force from the first differential planetary gear decelerator 11, the second differential planetary gear decelerator 34 is not affected by the actuation of the motor M or the manual opening and closing means 50, and primarily decelerates and transmits only a rotational force generated from the emergency return means 30 to the first differential planetary gear decelerator 11.

Accordingly, since the S-shaped spiral spring 33 of the emergency return means 30 is not compressed when the rotary shaft M1 of the motor M is rotated in one direction, the amount of load that the motor M handles is reduced, so that a small motor and small spur gears having small capacity are capable of being used, thereby being capable of reducing a size (volume) of the actuator and reducing a weight of the actuator.

At this time, a separate differential planetary gear decelerator mounted at a separate interlocking shaft may be additionally connected between the first differential planetary gear decelerator 11 and the second differential planetary gear decelerator 34, so that a deceleration ratio may be increased.

In addition, the worm gear deceleration unit R3 is configured to thirdly decelerates and transmits the rotational force of the motor M or the emergency return means 30 to the driven shaft 20, the rotational force being transmitted to the driving shaft 10, and is in the same manner as the known worm gear.

That is, the deceleration means of the present disclosure is configured as follows.

In the deceleration means of the present disclosure, the rotational force of the motor M is decelerated in three stages while sequentially passing through the spur gear deceleration unit R1, the first differential planetary gear decelerator 11, and the worm gear deceleration unit R3, and is transmitted to the driven shaft 20.

Further, the rotational force (elastic force) of the emergency return means 30 is decelerated in three stages while passing through the second differential planetary decelerator 34, the first differential planetary decelerator 11, and the worm gear deceleration unit R3, and is transmitted to the driven shaft 20.

Furthermore, the rotational force of the manual opening and closing means 50 is decelerated in two stages while sequentially passing through the first differential planetary gear decelerator 11 and the worm gear deceleration unit R3, and is transmitted to the driven shaft 20.

In addition, the emergency return means 30 is mounted inside the housing H that is separately coupled to a first side of the casing C.

Further, the elastic body mounted inside the housing H is formed of the S-shaped spiral spring 33 that rotationally returns the valve.

Specifically, the emergency return means 30 includes:

the first rotating body 31 mounted at the first side of the housing H; and the second rotating body 32 which is mounted at the second side of the housing H and which is provided with the actuation shaft 321.

Further, the S-shaped spiral spring 33 has the first side end which is connected to and wound on the first rotating body 31 such that the elastic force is accumulated, and has the second side end connected to the second rotating body 32.

The first rotating body 31 and the second rotating body 32 are formed in tape reel shapes, and the S-shaped spiral spring 33 is wound on the first rotating body 31 and the elastic force is accumulated.

At this time, the first rotating body 31 is simply mounted at the housing H.

However, the actuation shaft 321 axially protrudes and is connected to the second rotating body 32, and the second differential planetary gear decelerator 34 provided at an output side of the actuation shaft 321 is engaged with the first differential planetary gear decelerator 11. Therefore, the rotational force of the first rotating body 31, i.e., the elastic force of the S-shaped spiral spring is converted into the rotational force and is decelerated and transmitted to the driving shaft 10.

In addition, the S-shaped spiral spring 33 has opposite ends respectively coupled and connected to the first rotating body 31 and the second rotating body 32, and elastic forces at opposite side ends thereof act in opposite directions.

That is, in the first rotating body 31, an elastic force occurs in a direction where the S-shaped spiral spring 33 is released. However, in the second rotating body 32, an elastic force occurs in a direction where the S-shaped spiral spring 33 is wound.

Accordingly, in a state in which a rotation of the second rotating body 32 is stopped by the braking means 40 after the S-shaped spiral spring 33 is wound on the first rotating body 31, when the braking means 40 is turned off by a power failure and so on, the S-shaped spiral spring 33 functions as follows.

The S-shaped spiral spring 33 is configured such that the first side end of the S-shaped spiral spring 33 is released from the first rotating body 31 by the elastic force. At the same time, the second side end of the S-shaped spiral spring 33 is wound on the second rotating body 32 and rotates the actuation shaft 321 of the second rotating body 32.

Then, the rotational force of the actuation shaft 321 is sequentially transmitted to the driving shaft 10 and to the driven shaft 20, and the valve is opened and closed by rotationally returning the valve in a direction opposite to an initial actuation direction of the valve (that is, a direction closing the valve when the valve is in the opened state by electrically driving the valve, or a direction opening the valve when the valve is in the closed state).

Unlike a conventional typical coil spring or a torsion spring, such a S-shaped spiral spring 33 does not have a large difference between a preload according to compression and a pressure in a fully compressed state, and the strength and the size of gear components that are actuated by the elastic force of the S-shaped spiral spring 33 do not have to be large, so that a small motor with low output for electrically driving an actuator is capable of being used, thereby being capable of significantly reducing an overall size (volume) of the actuator.

In addition, since the rotational force that occurs by the S-shaped spiral spring 33 is decelerated in three stages through the deceleration means and is transmitted to the driven shaft 20, the final torque of the driven shaft is capable of being easily designed to match a conventional reference torque even if the small motor with low output is used, so that the miniaturization of the actuator may be realized.

Next, the braking means 40 is provided with the electromagnetic brakes that limit the actuation of the emergency return means 30.

Particularly, the braking means 40 is provided with at least two electromagnetic brakes that limit the actuation of the emergency return means 30, and the on and off actuations of each of the electromagnetic brakes are set to be alternately operated every predetermined time.

The electromagnetic brakes use magnets to stop rotations of brake rings 411 and 421, the brake rings 411 and 421 being coupled to each other by fitting a shaft portion of the second rotating body 32 thereinto.

Further, when the power is supplied, the brake rings 411 and 421 hold the second rotating body 32 such that the second rotating body 32 is not rotated. Furthermore, when the power is blocked, stopping of the brake rings 411 and 421 is released, so that the second rotating body 32 is capable of being rotated.

At this time, the electromagnetic brakes may be mounted such that a plurality of electromagnetic brakes are arranged on an outer side surface of the housing H in multiple columns in an axial direction of the second rotating body 32, so that each of the electromagnetic brakes may stop the shaft portion of the second rotating body 32.

More preferably, in a state in which one electromagnetic brake is mounted such that the one electromagnetic brake holds the shaft portion of the second rotating body 32, remaining electromagnetic brakes are disposed in a circumferential direction and are engaged with each other so as to be interlocked with each other.

To this end, the electromagnetic brakes include the interlocking gears 412 and 422 that are capable of being rotated together with the actuation shaft 321 during the off state.

The interlocking gears 412 and 422 protrude along the outer circumferential surfaces of the brake rings 411 and 421, respectively.

In addition, in the braking means 40, the interlocking gears 412 and 422 of the respective electromagnetic brakes are engaged and connected with each other, and the actuation shaft 321 is connected to one of the interlocking gears 412 and 422 of the electromagnetic brakes.

That is, after one electromagnetic brake holds the shaft portion of the second rotating body 32 and is mounted as a main electromagnetic brake 41, a remaining electromagnetic brake functions as an auxiliary electromagnetic brake 42 engaged with the main electromagnetic brake 41 such that the auxiliary electromagnetic brake 42 is interlocked with the main electromagnetic brake 41.

Accordingly, when the power is supplied to one of the electromagnetic brakes 41 and 42, the brake rings 411 and 421 of all of the electromagnetic brakes 41 and 42 are locked and are not capable of being rotated, due to an engagement structure of the interlocking gears 412 and 422. Therefore, the actuation of the emergency return means 30, i.e., the rotation of the actuation shaft 321 is prevented.

Further, when the on and off actuations of each of the electromagnetic brakes 41 and 42 are alternately repeated at a magnetization prevention limit time period, the magnetization of the electromagnetic brakes 41 and 42 does not occur while the actuation of the emergency return means 30 is in a state of being stopped in a normal state. Therefore, when an emergency situation occurs, the electromagnetic brakes 41 and 42 are actuated normally and are releasing a locked state of the second rotating body 32, so that the returning rotation of the valve by the emergency return means 30 is safely performed.

In addition, the manual opening and closing means 50 includes a shaft 51 engaged and connected with the driving shaft 10, a manual actuation portion 52 capable of rotating the shaft 51, and a clutch lever 53 selectively connects the shaft 51 to the manual actuation portion 52.

The shaft 51 has a gear which is positioned at a first side end portion of the shaft 51 and which is engaged with a spur gear at the input side of the driving shaft 10.

The manual actuation portion 52 is formed in a handle shape or a lever shape, and is mounted such that the manual actuation portion 52 is spaced apart from the shaft 51 on the same line by a predetermined distance.

The clutch lever 53 is configured to connect or separate the shaft 51 to the manual actuation portion 52, and a known clutch structure may be employed.

Accordingly, in the normal state, a clutch portion 531 of the clutch lever 53 separates the shaft 51 from the manual actuation portion 52 such that the shaft 51 and the manual actuation portion 52 are not interlocking with each other, thereby preventing the manual actuation portion 52 from rotating together with the shaft 51 during the electrical actuation.

In addition, in a facility inspection situation or an emergency situation, when a worker rotates the shaft 51 by the manual actuation portion 52 after the worker interlocks the shaft 51 with the manual actuation portion 52 by using the clutch portion 531 of the clutch lever 53, the rotational force is transmitted to the driven shaft 20 by the driving shaft 10, so that the valve is capable of being manually rotated to be opened and closed.

In addition, the present disclosure further includes a hydraulic stopper 60 which stops the rotation of the valve and which also relieves a contact shock to the worm wheel portion 21.

The hydraulic stopper 60 includes:
support pipes 61 coupled and fixed to positions spaced apart from opposite side ends of the worm wheel portion 21 by a predetermined distance;
buffer cylinders 62 which are fitted into and coupled to respective support pipes 61 such that the buffer cylinders 62 can protrude toward front end portions of the respective support pipes 61 and which have respective buffer portions 621 in which a hydraulic oil is filled;
buffer pins 63 which are respectively coupled to inner portions of the support pipes 61 and which are provided with respective piston portions 631 that are fitted into the respective buffer portions 621; and
compression springs 64 which are respectively supported by front surfaces of the respective piston portions 631 and which are elastically supporting the respective buffer cylinders 62 such that the buffer cylinders 62 are moved forward.

The buffer cylinder 62 is provided with a contact portion 622 which is coupled to the front end portion of the buffer cylinder 62 and which is formed of a soft material such as rubber, the buffer portion 621 is sealed by an O-ring of a cap 623 that is coupled to a rear end portion of the buffer cylinder 62, and the hydraulic oil is filled in the buffer portion 621.

The buffer pin 63 is fitted such that the buffer pin penetrates the cap 623, and the piston portion 631 divides the buffer portion 621 into two front and rear spaces.

At this time, an orifice structure that allows the hydraulic oil to flow into the front and rear spaces of the piston portion 631 is formed in the buffer cylinder 62 or the piston portion 631 or both of the buffer cylinder 62 and the piston portion 631.

The compression spring 64 supports the buffer cylinder 62 such that the buffer cylinder 62 is moved forward with respect to the piston portion 631 and the contact portion 622 protrudes outward from the front end of the support pipe 61.

Accordingly, by the rotation of the driven shaft 20, the first side end of the worm wheel portion 21 is in contact with the contact portion 622 of the buffer cylinder that is positioned at a rotation path, so that the buffer cylinder 62 receives a pressure that inserts the buffer cylinder 62 into the support pipe 61.

As such, when the buffer cylinder 62 is inserted, the piston portion 631 pushes the hydraulic oil of the buffer portion 621 so that the hydraulic oil flows into the space at a rear end of the piston portion 631 by the orifice structure. At this time, as the buffer cylinder 62 is inserted in a low speed by a repulsive pressure of the hydraulic oil, a shock applied to the buffer cylinder 62 is reduced and relieved.

In addition, when an external force applied to the buffer cylinder 62 is relieved, the buffer cylinder 62 moves forward by an elastic force of the compression spring 64 and is returned to an original position. At this time, the hydraulic oil at the rear end of the piston portion 631 flows again into the front space of the piston portion 631 and is filled inside the front space.

When the valve is rotated, particularly when the valve is actuated by the emergency return means 30, such a hydraulic stopper 60 buffers a shock generated when the valve is stopped after the valve is rotated in a high speed, thereby preventing damage to components of the actuator.

That is, in the motor M or the manual opening and closing means 50, a rotation angle and a rotation speed of the valve may be easily controlled.

However, in the emergency return means 30, due to the high elastic force of the S-shaped spiral spring 33, the valve, i.e., the driven shaft 20 is rotated at a relatively very high speed even if the deceleration occurs.

At this time, a stopper for stopping the rotation of the driven shaft 20 is required, but a conventional typical stopper is frequently damaged since the conventional typical stopper is not capable of relieving a shock applied by a high rotational speed of the worm wheel portion 21. However, the present disclosure may prevent damage to components by applying the hydraulic stopper 60 configured as described above.

Figure 6A:
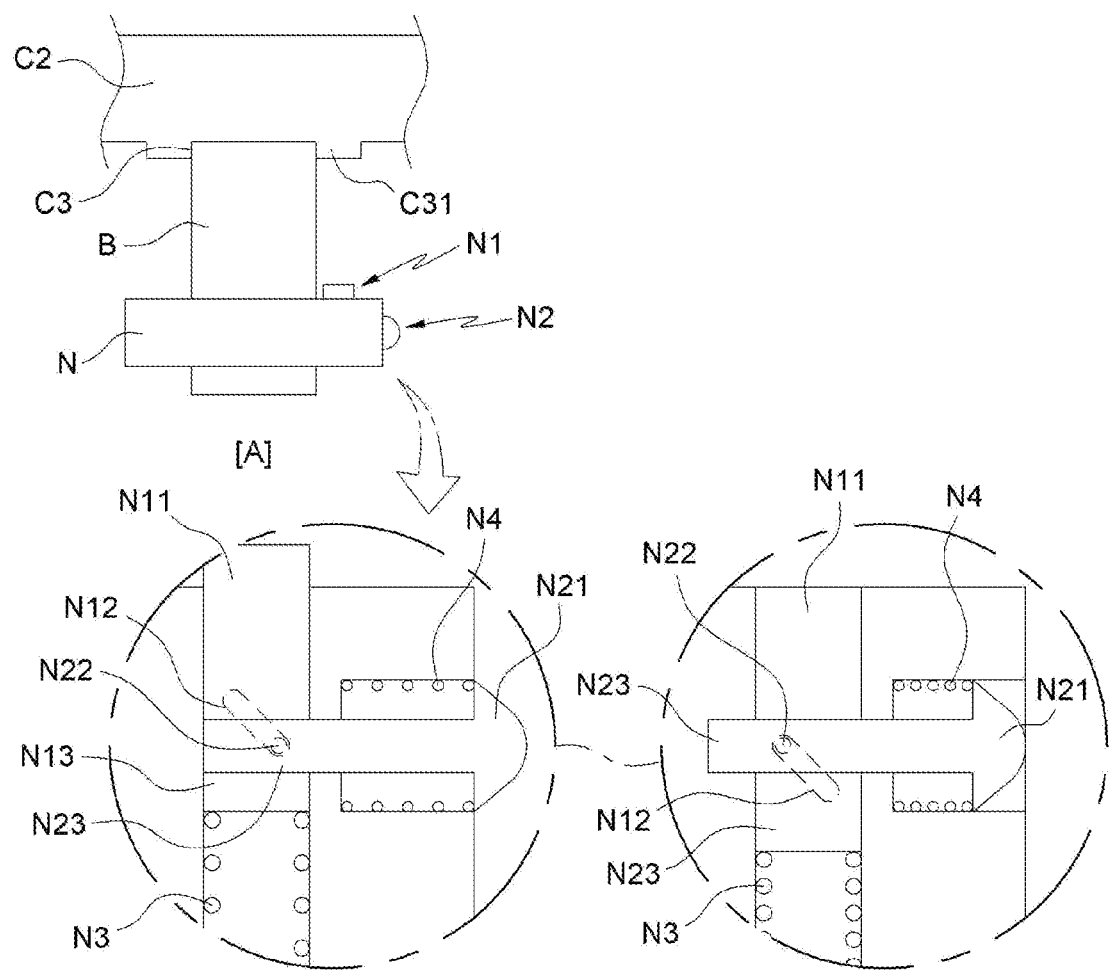
FIGS. 6a and 6b are cross-sectional views illustrating main parts of a nut loosening prevention means of the present disclosure.
Figure 6B:
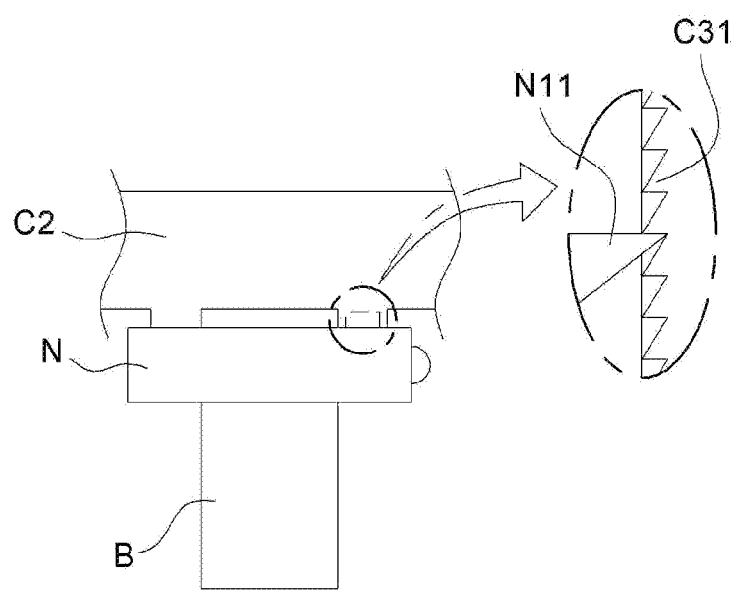

Meanwhile, the casing C is assembled by coupling upper and lower casings C1 and C2 with a bolt B and a nut N. Since the nut N can be loosened by operational vibration, the present disclosure further includes a nut loosening prevention means as illustrated in FIGS. 6a and 6b, so that the bolt B is more rigidly fixed and a coupling force of the bolt B is increased.

The nut loosening prevention means includes:
a ratchet tooth portion C31 formed along a circumference of an outer side surface of a screw hole C3 of the casing C; and
a ratchet bar N1 including a binding portion N11 which is elastically supported in a direction to the ratchet tooth portion C31 from inside the nut N and which protrudes toward a front surface of the nut N such that the binding portion N11 is capable of being locked on the ratchet tooth portion C31, the ratchet bar N1 including a pushed portion N13 that is provided with a cam groove N12 which extends and is connected to a rearward of the binding portion N11 and which is inclined upward to the outside from inside of a first side of the cam groove N12.

Further, the nut loosening prevention means includes a pressing bar N2. The pressing bar N2 includes: a pressed portion N21 which is elastically supported toward one surface of hexagonal surfaces of the nut N from inside the nut N and which protrudes the one surface of the hexagonal surface of the nut N; and a pressing portion N23 including a pressing protrusion N22 which extends and is connected to a lower portion of the pressed portion N21 and which is in contact with the first surface of the pushed portion N13 in a direction orthogonal to the pushed portion N13 and which is fitted into the cam groove N12.

In the ratchet tooth portion C31, teeth having inclined surfaces that are inclined upward in a tightening direction of the nut N are arranged in a circular shape along the circumference of the screw hole C3, and protrudes to a rear surface.

The ratchet bar N1 is fitted into an appearing and disappearing groove formed on the front surface of the nut N, and the rear end of the pushed portion N13 is supported by a first spring N3, so that the binding portion N11 protrudes toward the front surface of the nut N.

The pressing bar N2 is fitted into another appearing and disappearing groove formed on one of the hexagonal surfaces of the nut N, and a lower end of the pressed portion N21 is supported by a second spring N4. Further, the pressed portion N21 protrudes to one of the hexagonal surfaces of the nut N, and the pressed portion N21 is formed in a hemispherical shape.

Therefore, when the nut N is tightened to the bolt B and the binding portion N11 is in contact with the ratchet tooth portion C31, the ratchet bar N1 protrudes in front and rear directions and the binding portion N11 is completely tightened to the screw portion 152 by passing through the ratchet tooth portion C31. After then, since the binding portion N11 is locked on one of the teeth of the ratchet tooth portion C31, the nut N is not loosened by vibration and so on.

In addition, when a wrench is fitted in line with the hexagonal surfaces of the pressing bar N2, the pressed portion N21 is pressed by the wrench and the pressing bar N2 is inserted. At this time, as the pressing portion N23 is moved downward in a vertical direction thereof, the pressing protrusion N22 is moved downward and is pushing the inclined surface of the cam groove N12, thereby pushing the pushed portion N13 rearward. Accordingly, the ratchet bar N1 is moved backward and the binding portion N11 is inserted inside the nut N, and the ratchet bar N1 is separated from the ratchet tooth portion C31, so that the nut N is capable of being easily released by the wrench.

In describing the present disclosure above, the compact spring return actuator has been mainly described with reference to the accompanying drawings, but the present disclosure may be variously modified, changed, and substituted by those skilled in the art. Such modifications, changes, and substitutions should be construed as falling within the scope of the present disclosure.

The invention claimed is:

1. A compact spring return actuator, the actuator comprising:
   a driving shaft configured to be rotated by receiving a driving force from a motor;
   a driven shaft configured to open and close a valve by being rotated by the driving shaft;
   a first differential planetary gear decelerator provided at the driving shaft, the differential planetary gear decelerator being configured to decelerate a rotational force that is transmitted to the driven shaft;
   an elastic body and an actuation shaft configured to convert an elastic force of the elastic body to a rotational force and to transmit the rotational force, the actuation shaft being engaged with the first differential planetary gear decelerator, thereby being configured to rotationally return the valve when power is blocked; and
   two electromagnetic brakes configured to limit an actuation of the elastic body and the actuation shaft, and the two electromagnetic brakes being configured to be set such that on and off actuations of each of the two electromagnetic brakes are alternately operated every predetermined time so that one of the two electromagnetic brakes is turned off when the other one of the two electromagnetic brakes is turned on.

2. The actuator of claim 1, wherein the elastic body is formed of an S-shaped spiral spring.

3. The actuator of claim 1, further comprising: a second differential planetary gear decelerator which is provided at the actuation shaft and which is engaged and connected with the first differential planetary gear decelerator.

4. A compact spring return actuator, the actuator comprising:
   a driving shaft configured to be rotated by receiving a driving force from a motor;
   a driven shaft configured to open and close a valve by being rotated by the driving shaft;
   a first differential planetary gear decelerator provided at the driving shaft, the differential planetary gear decelerator being configured to decelerate a rotational force that is transmitted to the driven shaft;
   an elastic body and an actuation shaft configured to convert an elastic force of the elastic body to a rotational force and to transmit the rotational force, the actuation shaft being engaged with the first differential planetary gear decelerator, thereby being configured to rotationally return the valve when power is blocked; and
   a second differential planetary gear decelerator which is provided at the actuation shaft and which is engaged and connected with the first differential planetary gear decelerator.

5. The actuator of claim 4, wherein the elastic body is formed of an S-shaped spiral spring.

* * * * *